US010027276B2

(12) United States Patent
Almy et al.

(10) Patent No.: US 10,027,276 B2
(45) Date of Patent: Jul. 17, 2018

(54) PHOTOVOLTAIC MOUNTING SYSTEM

(71) Applicant: SolarCity Corporation, San Mateo, CA (US)

(72) Inventors: Charles Almy, Berkeley, CA (US); Tyrus Hudson, San Rafael, CA (US); David Molina, San Rafael, CA (US); Jack West, San Rafael, CA (US)

(73) Assignee: SolarCity Corporation, San Mateo, CA (US)

(*) Notice: Subject to any disclaimer, the term of this patent is extended or adjusted under 35 U.S.C. 154(b) by 0 days.

(21) Appl. No.: 14/839,303

(22) Filed: Aug. 28, 2015

(65) Prior Publication Data
US 2016/0226432 A1 Aug. 4, 2016

Related U.S. Application Data

(60) Provisional application No. 62/112,559, filed on Feb. 5, 2015, provisional application No. 62/109,659, filed on Jan. 30, 2015.

(51) Int. Cl.
H02S 20/30 (2014.01)
H02S 20/23 (2014.01)
F24J 2/52 (2006.01)

(52) U.S. Cl.
CPC ............ H02S 20/30 (2014.12); F24J 2/52 (2013.01); F24J 2/526 (2013.01); F24J 2/5245 (2013.01);
(Continued)

(58) Field of Classification Search
CPC .. F24J 2/52; F24J 2/5201; F24J 2/5207; F24J 2/5232; F24J 2/5233; F24J 2/5239;
(Continued)

(56) References Cited

U.S. PATENT DOCUMENTS 5,711,116 A * 1/1998 Hasan ............... E04D 5/142
428/189
7,435,134 B2 10/2008 Lenox
(Continued)

FOREIGN PATENT DOCUMENTS

CN 203 761 322 U 8/2014
DE 10 2012 209395 A1 12/2013

OTHER PUBLICATIONS

PCT/US2016/015583, "Invitation to Pay Additional Fees and Partial Search Report", dated Apr. 8, 2016, 8 pages.
(Continued)

Primary Examiner — Jessica L Laux
(74) Attorney, Agent, or Firm — Kilpatrick Townsend & Stockton LLP

(57) ABSTRACT

A two-piece rooftop photovoltaic mounting system. A fixed base portion is attached directly to a roof surface via a lag bolt or other mechanical fastener. A movable portion is attached to and pivots about the base portion providing freedom of movement radially and axially with respect to the base portion. A photovoltaic module coupler is attached to the movable portion to support at least two photovoltaic modules at a location dictated by positioning of the movable portion. A locking nut locks the movable portion to the base portion at the desired location. A sheet of sealant material under the base portion helps prevent ingress of water into the roof surface via the lag bolt.

8 Claims, 18 Drawing Sheets

(52) U.S. Cl.
CPC .............. *F24J 2/5258* (2013.01); *H02S 20/23* (2014.12); *Y02B 10/12* (2013.01); *Y02B 10/20* (2013.01); *Y02E 10/47* (2013.01)

(58) Field of Classification Search
CPC ........ F24J 2/5243; F24J 2/5245; F24J 2/5258; F24J 2/5254; F24J 2/5252; F24J 2/5264; F24J 2/526; F24J 2/5262; F24J 2/54; F24J 2/5403; F24J 2/5406; F24J 2002/5294; F24J 2002/5283; F24J 2002/529; E02S 20/23; E02S 20/30; E02S 20/00
See application file for complete search history.

(56) References Cited

U.S. PATENT DOCUMENTS

| | | | |
|---|---|---|---|
| 8,166,713 B2 | 5/2012 | Stearns et al. | |
| 8,752,338 B2 * | 6/2014 | Schaefer | F24J 2/5245 52/173.3 |
| 8,756,881 B2 | 6/2014 | West et al. | |
| 8,826,618 B2 | 9/2014 | Stearns | |
| 8,839,575 B1 | 9/2014 | Liu et al. | |
| 9,121,545 B2 * | 9/2015 | Stanley | F16M 13/022 |
| 9,134,044 B2 | 9/2015 | Stearns et al. | |
| 9,166,524 B2 * | 10/2015 | West | F24J 2/5205 |
| 9,397,607 B2 | 7/2016 | Atchley et al. | |
| 9,413,286 B2 * | 8/2016 | Danning | B23P 11/00 |
| 9,473,066 B2 * | 10/2016 | Stephan | H02S 20/23 |
| 2011/0297808 A1 | 12/2011 | Yamanaka et al. | |
| 2013/0091692 A1 | 4/2013 | Stanley | |
| 2013/0133270 A1 | 5/2013 | West et al. | |
| 2013/0167455 A1 | 7/2013 | Jenkins et al. | |
| 2013/0231479 A1 * | 9/2013 | Furukawa | A61K 31/17 544/182 |
| 2013/0291479 A1 | 11/2013 | Schaefer et al. | |
| 2013/0340358 A1 * | 12/2013 | Danning | B23P 11/00 52/126.7 |
| 2014/0175244 A1 | 6/2014 | West et al. | |
| 2015/0034355 A1 | 2/2015 | Patton et al. | |
| 2015/0280638 A1 * | 10/2015 | Stephan | H02S 20/23 52/173.3 |
| 2016/0134230 A1 * | 5/2016 | Meine | H02S 20/23 52/698 |
| 2016/0218660 A1 * | 7/2016 | Meine | F24J 2/52 |
| 2016/0218661 A1 * | 7/2016 | Meine | F24J 2/52 |
| 2016/0226435 A1 | 8/2016 | Almy et al. | |
| 2016/0268959 A1 * | 9/2016 | Meine | H02S 40/36 |

OTHER PUBLICATIONS

International Search Report, dated Sep. 13, 2016 for International Patent Application No. PCT/US2016/015583, 8 pages.
Written Opinion, dated Sep. 13, 2016 for International Patent Application No. PCT/US2016/015583, 12 pages.
Notice of Allowance dated Oct. 12, 2017, for related U.S. Appl. No. 14/839,252, filed Aug. 28, 2015. 10 pages.

* cited by examiner

PHOTOVOLTAIC MOUNTING SYSTEM

CROSS REFERENCE TO RELATED APPLICATIONS

This application claims priority to provisional patent applications Nos. 62/112,559, filed Feb. 5, 2015, and 62/109,659, filed Jan. 30, 2015, the disclosures of which are hereby incorporated by reference in their entirety.

FIELD OF THE INVENTION

The invention relates to photovoltaic energy generation mounting systems and more specifically to systems and methods for installing photovoltaic modules on composition shingle roofs.

BACKGROUND OF THE INVENTION

Residential and commercial solar power has become increasing popular as industry costs have come down and the importance of diversifying away from fossil fuel-based power has increased. Some of this is attributable to reductions in module costs and some is attributable to innovations in mounting hardware, which in turn reduce material costs and labor costs. Other factors, including rising $CO_2$ levels, and increased awareness of climate change are also contributing to the rapid adoption of solar. In order to maintain solar energy's current momentum and for the industry to continue to scale at current rates, additional reductions in cost-per-watt must be achieved relative to other forms of so-called "dirty power."

Solar systems have relatively few components. The primary ones are the panels, mounting system, inverters, electrical interfaces to existing grid power, and the labor involved installation. Therefore, a reduction in any one of these will have a measurable impact on the cost per watt of solar. Solar mounting systems in particular effect not only hard costs associated with a solar system, but also potentially soft costs such as labor, crew size and installation times.

Traditionally, solar panels have been installed using aluminum or steel rails and mounting brackets. These rails were laid out in a grid pattern over the desired array location and the modules were clamped down or otherwise attached to these rails. While functional, rail-based systems utilize large amounts of material and take a relatively long time to install. Eventually, pioneers in the solar industry, like Jack West of San Rafael, Calif.-based Zep Solar, recognized that the frames of solar panels are sufficiently rigid to support their own weight and withstand wind forces without requiring rails. This led many solar mounting hardware makers and installers to eventually move towards rail-free or so-called direct mount systems. These rail-free systems rely on solar panel mounting brackets that are attached directly to the roof without any rails.

Most modern rail-free systems, and in particular those used on composite shingle roofs, the most prevalent residential roof-type in the United States, rely on flashings. Flashings are flat pieces of sheet metal used to divert rainwater around chimneys, skylights, attic fans and other structures that penetrate a roof surface. Although low-tech in nature, flashings do provide some advantages in solar installations. First, they are universally accepted by building inspectors for protecting roof penetrations from water leakage. Second, because they are relatively large compared to the size of a drill hole, when used in solar installations, they cover up errant drill holes that miss a roof rafter.

These advantages, however, come at a cost. First, flashings are expensive. In solar applications, they are often specially manufactured with stamped features to mate with a particular mounting bracket, they may contain rubber parts, and they require additional installation time, materials and tools. Second, in order to properly install a flashing, existing roofing nails holding down the surrounding shingles need to be cut or removed so that the flashing can be tucked under the up-roof course of shingles. Every roofing nail that is removed to accommodate a flashing is a potential point of ingress for water requiring additional sealing. Third, because of the modifications that must be made to the roof to accommodate a flashing, all flashings and mounting supports have to be installed first. This creates an installation bottleneck because all flashings must be correctly positioned and permanently installed before any solar panels can be placed.

Therefore, there exists a need for a rail-free mounting system that is not dependent on flashings, and that can be installed in-step with the array, without compromising the other benefits conventional rail-free systems.

SUMMARY OF THE INVENTION

The present invention provides a new and improved mounting system for roof-based photovoltaic modules, and in particular those installed on composite shingle roofs, that reduces installation times, hardware costs, and part counts relative to existing mounting solutions.

In various embodiments of the invention, these benefits are attained with a two-piece mounting system. The system may have a substantially planar base portion with at least one through-hole for accommodating a lag bolt or other mechanical fastener to secure the base portion to a roof surface and a pivot point protruding away from a roof-facing surface. A movable portion may be coupled to the base portion by the pivot point, and have a slot formed therein, wherein the pivot point passes through the slot, allowing the movable portion to move about the pivot point laterally and rotationally. A fastener may be attached to the pivot point to secure the movable portion in a particular position with respect to the base portion. A two-sided coupler attached to the movable portion by a support post, wherein a distance between the support post and the coupler is adjustable. In various embodiments, the system also includes a layer of butyl or other sealing adhesive that provides a seal between the underside of the base portion and a roof surface around the hole containing the lag bolt that attaches the base portion to the roof, thereby preventing the ingress of water via the roof penetration.

Various embodiments may provide a mounting system for photovoltaic panels that includes a disc-shaped base portion having a plurality of raised portions on a first array-facing side and a layer of sealant material on an opposite roof-facing side. The side having the plurality of raised portions may include an elevated support terminating in a gasket with at least one through-hole for accommodating a lag bolt to secure the base portion to a roof surface and to serve as a pivot point. The system may also include a movable portion, coupled to the base portion by the pivot point, and having a channel formed therein, wherein the pivot point passes through the channel allowing the movable portion to move about the pivot point laterally and rotationally while at least partially resting on the plurality of raised portion. The system may further include a fastener, attached to the pivot point that secures the movable portion in a particular position with respect to the base portion via the channel. A photovoltaic module coupler may be attached to the movable portion by a support, wherein a distance between the movable portion and the coupler is adjustable.

Various embodiments may provide a mounting system for photovoltaic panels including a substantially rigid, planar base portion having a plurality of raised portions on a first array-facing side and a layer of compressible material on an opposite side roof-facing, with at least one through-hole passing completely through the base portion from the first side to the opposite side. The system may also include at least one compressible washer located on the first side of the base portion surrounding the through-hole, and a rigid washer located over the compressible washer and adapted to distribute a compression force across the compressible washer, thereby preventing the ingress of water into the through-hole. The system may further include a tubular portion having a first side, facing the base portion, an opposite facing second side, facing away from the base portion, and two conjoining wall portions joining the first side to the second side thereby creating a section of hollow tube, wherein the first side and the second side each include a commonly oriented slot adapted to permit a mechanical fastener to pass entirely there through and to allow adjustment of the tubular portion with respect to the base portion in both the lateral and radial directions. At least one locking nut may be adapted to mate with a top threaded portion of the mechanical fastener to compress the tubular portion against the base portion. A photovoltaic module coupling device attached to the base portion may be used for coupling to at least two photovoltaic modules.

Other embodiments may provide a photovoltaic mounting system having a lower pyramid having a bottom surface, a top surface, and a pair of inwardly sloping walls connecting the bottom surface to the top surface, and an upper pyramid, having a bottom surface matching the width of and resting at least in part of the top surface of the base portion, a top surface, a pair of inwardly sloping walls angled at the same angle as the pair of inwardly sloping walls of the base portion. A pair of collinear slots formed in the top and bottom surfaces of the upper pyramid allows an adjustment bolt to pass through so that the upper pyramid can move with respect to the lower pyramid while remaining attached thereto. A photovoltaic module coupling device may be connected to the upper pyramid for supporting the frames of at least two adjacent photovoltaic modules.

Still further embodiments may provide a photovoltaic mounting system having a tubular base portion having a bottom surface, a top surface, and a pair of sidewalls interconnecting the top and bottoms surfaces and defining a tube. A mechanical fastener may be used to attach the tubular base portion to a support surface. A pivot point protruding from the top surface of the base portion is used to limit the movement of a movable portion resting on the base portion. A photovoltaic module coupling device may be attached to the movable portion for supporting the frames of at least two photovoltaic modules.

These and other features and embodiments are illustrated and explained in greater detail in the paragraphs that follows.

BRIEF DESCRIPTION OF THE DRAWINGS

In order to facilitate a fuller understanding of the present disclosure, reference is now made to the accompanying drawings, in Inch like elements are referenced with like numerals. These drawings should not be construed as limiting the present disclosure, but are intended to be exemplary only.

DETAILED DESCRIPTION

Figure 1:
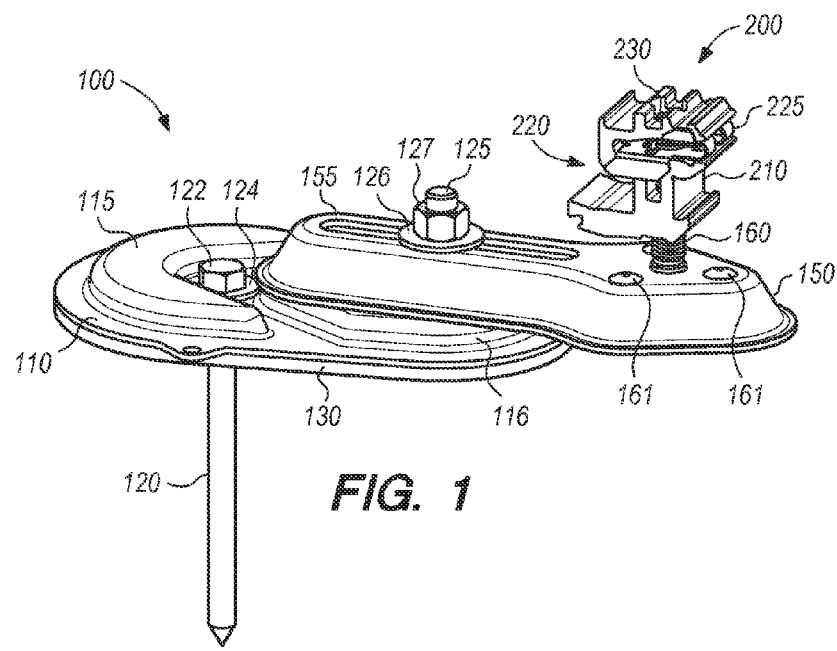
FIGS. 1 and 2 are perspective views of a two-piece photovoltaic module mounting system according to one exemplary embodiment of the invention.

Various exemplary embodiments of the invention will now be described in greater detail in the context of the drawing figures. Referring now to FIG. 1, this Figure illustrates a perspective view of a two-piece photovoltaic module mounting system according to various embodiments of the invention. System 100 includes base portion 110 and movable portion 150. Base portion 110 is adapted to rest on a roof surface of a structure (e.g., residence, barn, garage, office, or other building) and may therefore be substantially planar in its geometry to match the substantially planer geometry of a roof surface, such as a composite shingle roof surface.

In various embodiments, and as illustrated in FIG. 1, base portion 110 may include raised portions 115 and 116 respectively that together provide a level platform for movable portion 150 to rest on as it is moved into the desired position with respect to base portion 110. Base portion 110 may also have opening 118, as shown in FIGS. 2, 3, 4A, and 4B, through which a mechanic fastener, lag bolt, or lag screw, such as lag bolt 120, may pass. It should be appreciated that although lag bolt 120 is shown as smooth in the Figures, that in various embodiments, it will be at least partially threaded so that it can be torqued into a pre-drilled pilot hole using an impact driver or other torqueing device, as opposed to being driven in with a hammer.

In various embodiments, raised portions 115 and 116 may be sufficiently high relative to the top of base portion 110 so that when lag bolt 120 is driven into a roof deck or roof rafter (not shown) and rests on base portion 110, head 122 of lag bolt 120 will be no higher than the top of raised portions 115 and 116. In this way, movable portion 150 will be free to slide across the top of base portion 110, along raised portions 115 and 116, without running into head 122 of lag bolt 120. In other words, the height of raised portions 115 and 116 relative to base portion 150 is preferably large enough to equal or exceed the height of lag bolt head 122 relative to base portion 110.

Alternatively, base portion 110 may have multiple holes 118 to accommodate multiple lag bolts. This is particularly true in deck-mount applications where each bolt merely penetrates the roof deck but is not necessarily anchored in a roof rafter.

Figure 3:
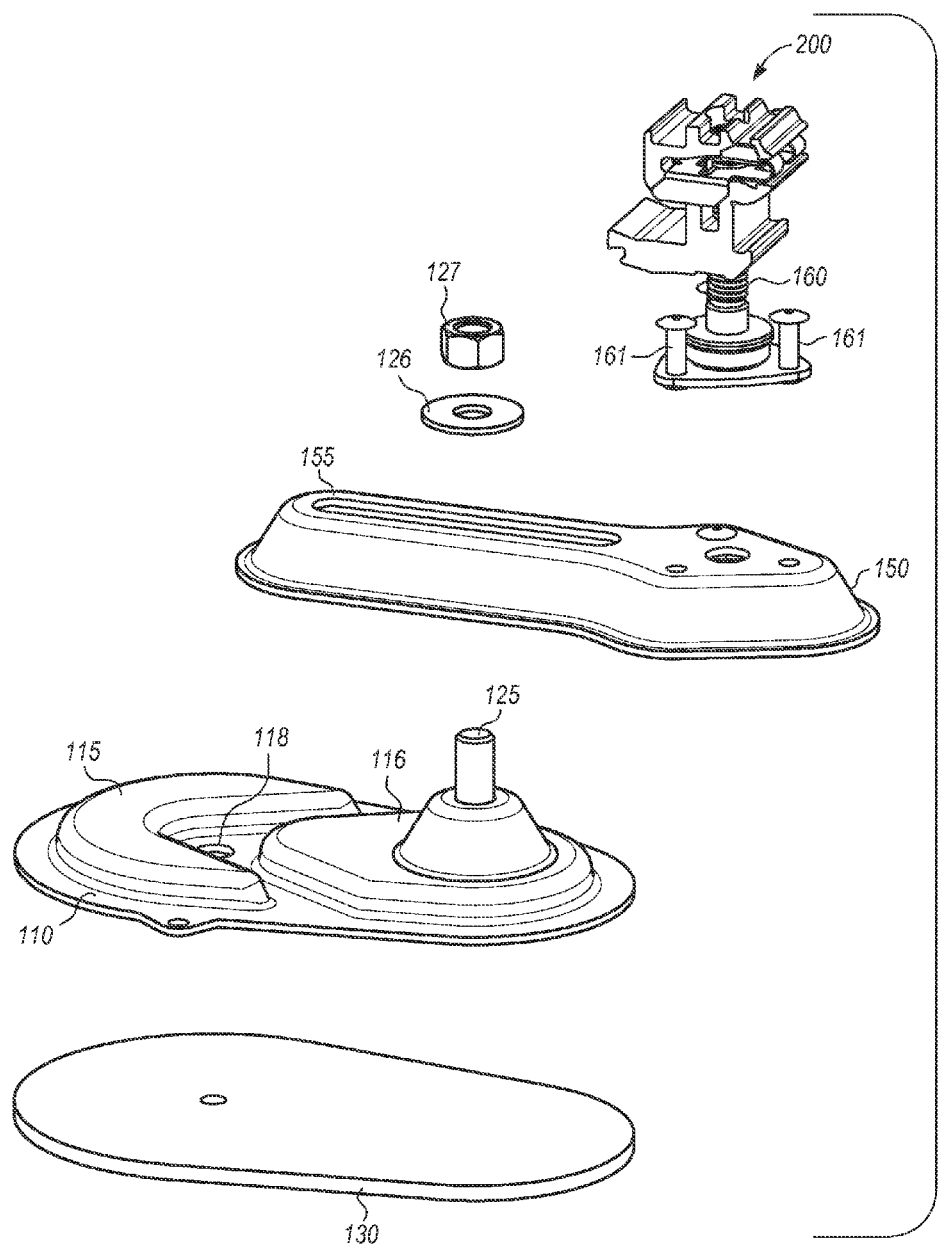
FIG. 3 is an exploded view of the two-piece photovoltaic module mounting system illustrated in FIGS. 1 and 2.
Figure 4A:
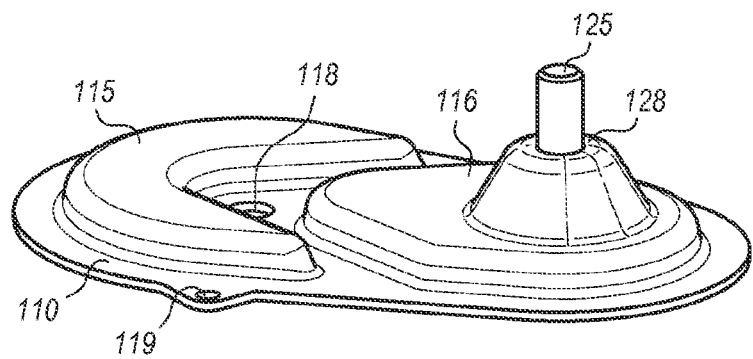
FIGS. 4A and 4B are perspective and top views respectively of a base portion of the two-piece photovoltaic module mounting system shown in FIGS. 1 and 2.
Figure 4B:
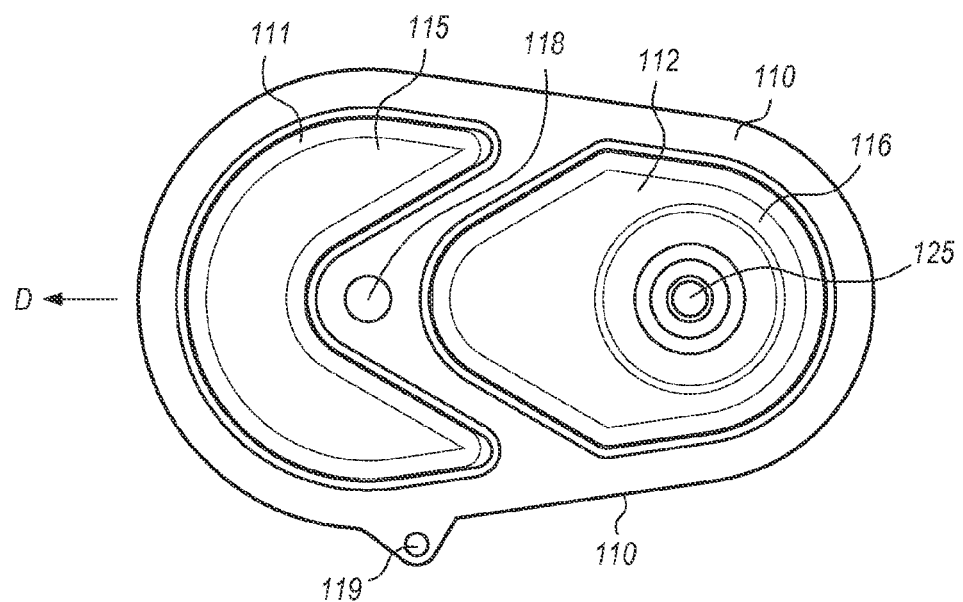

As shown in FIG. 3, as well as in FIGS. 4A and 4B, in various embodiments base portion 110 may also include a stud, such as stud 125, that is used as a pivot point for movable portion 150 to move with respect to base portion 110. In various embodiments, a rubber grommet such as grommet 128 may surround stud 125 to prevent the ingress of water between base portion 110 and a roof surface. Base portion 110 may also include a pilot hole guide, such as pilot hole guide 119 depicted in FIGS. 4A and 4B. In various embodiments, a straight line distance between pilot hole guide 119 and stud 125 will be the same as the distance between lag bolt hole 118 and stud 125 so that an installer can drill a pilot hole that will result in stud 125 being located at a desired position relative to opening 118 when lag bolt 120 is torqued through opening 118. As will be described in greater detail below, this may be particularly useful in applications that include a sealant pad underneath base portion 110, for example, to prevent the drill bit from passing through the sealant pad, compromising the integrity of the pad and also causing the drill bit to become gummed up with sealant.

The exploded view of FIG. 3 shows sealant pad 130 under base portion 110. In various embodiments, sealant pad 130 is made of a butyl, however, it should be appreciated that butyl is just one exemplary material that could be used to seal the underside of base portion 110 to prevent the ingress of rainwater around lag bolt 120. In addition to sealing around lag bolt 120, sealant pad 130 may also cover nearby drill holes resulting from failed attempts to drill a pilot hole into the roof rafter that are close enough to the actual lag bolt hole to be covered by base portion 110 when it is correctly placed.

In various embodiments, base portion 120 may be manufactured or preassembled with a pre-cut sealant pad such as butyl sealant pad 130 that is pre-attached to the underside of the base portion 110. In various embodiments, pad 130 may also include a release sheet (not shown) on its underside that is pulled off at the time of installation. Alternatively, individual pre-cut sealant pads may be provided with release sheets on both sides that can be affixed to the underside of a base portion 110 on one side and the roof surface on the other side by an installer at the time of installation. As yet another alternative, base portion 110 may simply be bare metal underneath and an installer may apply a layer of sealant to the underside, to the roof surface, or to both, using a caulk gun, tube or other applicator.

Continuing with reference to FIG. 1, exemplary system 100 also includes movable portion 150. Like fixed portion 110, movable portion 150 may also be made of a single piece of stamped, forged, or cast metal. In various embodiments, movable portion 150 will include slot 155 formed in a top surface through which stud 125 passes to enable movable portion 150 to pivot about stud 125 both laterally (towards and away from the stud) and rotationally (360° around the stud).

In preferred embodiments, movable portion 150 may also include photovoltaic module coupling device or coupler 200, which is attached to an opposite end of movable portion 150 from slot 155. In some embodiments, coupling device 200 may be permanently attached to movable portion 150 with rivets 161 so that these two items are delivered as a single assembly. In other embodiments, coupling device 200 may be a separate part that is attached to movable portion 150 by an installer at the time of installation, for example, with a nut on the bottom side of movable portion 150.

As shown in the Figures, coupling device 200 is preferably attached to the movable portion 150 such that a distance between coupling device 200 and movable portion 150 is adjustable. The mechanism for accomplishing that in the embodiments illustrated in the Figures is threaded stud 160, which passes through opening 230 formed in the coupling device 200. In a preferred embodiment, coupling device 200 is attached to movable portion 150 such that threaded stud 160 is free to rotate independent of the coupling device 200, to raise and lower coupling device 200 with respect movable portion 150. In various embodiments, this may be accomplished with a Torx head, hex head, slotted head, or Phillips head in the top of threaded stud 160 that is accessed with a tool via opening 230 in the top of coupling device 200. In this manner, it will be possible to adjust the height of a photovoltaic module or modules, a fire skirt, and/or other structure attached to the coupling device 200 with respect to a roof surface, from above, after those structures are attached to coupling device 200.

It should be appreciated, however, that another mechanism could be used to make the distance between coupling device 200 and movable portion 150 adjustable that does not permit post-installation height adjustment. Such modifications are within the spirit and scope of the various embodiments of the invention.

Once movable portion 150 is placed on base portion 110 so that stud 120 passes through slot 155, movable portion 150 can be oriented in virtually any position in the plane above base portion 110 permitted by the length of slot 155.

Once the movable portion 150 has been positioned so that coupling device 200 is located at the desired position vis-à-vis any photovoltaic modules or other structures to be attached, movable portion 150 and base portion 110 can be locked together, for example, with washer 126 and locking nut 127 to lock coupling device 200 in the desired position. An impact driver or other torqueing device may be used to tighten nut 127 as is well known in the art. Adjustments to the position of coupling device 200 can be easily made by simply loosening locking nut 127 and moving movable portion 150 with respect to base portion 110 until coupling device 200 reaches the desired location and locking nut 127 is again torqued down.

Figure 2:
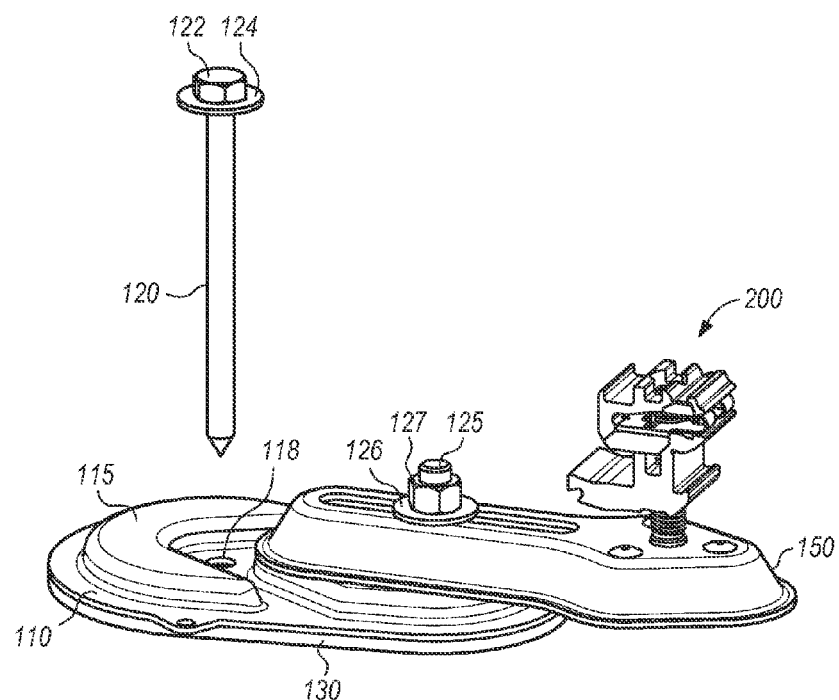

With continued reference to FIGS. 1 and 2, coupling device 200 as illustrated, is a rock-it style pivot locking coupling device, such as that manufactured by SolarCity Corp., which is arranged to connect to a groove formed in the side of a pair of adjacent PV modules. Such a coupling device is described and illustrated, for example, in commonly assigned U.S. patent application Ser. No. 14/615,320, Publication No. 2015/0155823-A1, the disclosure of which is herein incorporated by reference in its entirety. It should be appreciated, however, that another type of coupling device, such as, for example, a clamping-style coupling device that is also capable of attaching to the frames of two or more photovoltaic modules could also be used with the various embodiments of the invention. Such clamping-style coupling devices typically include a fixed base portion and an upper clamping portion that clamps down on the frame of a photovoltaic module, biasing it against the base portion of the coupling upon application of rotational torque to a bolt or screw on the top side of the clamping portion.

In the example shown in the Figures, coupling device 200 includes key side 210 (typically, though not necessarily, oriented to point down-roof), tongue side 220 (typically, though not necessarily, oriented to point up-roof), and spring portion 225 that cuts into the panel frames, array skirts or other structures attached to each side of coupling device 200 to form an integral ground bond between such components after they are pivot locked into coupling device 200.

Figure 5:
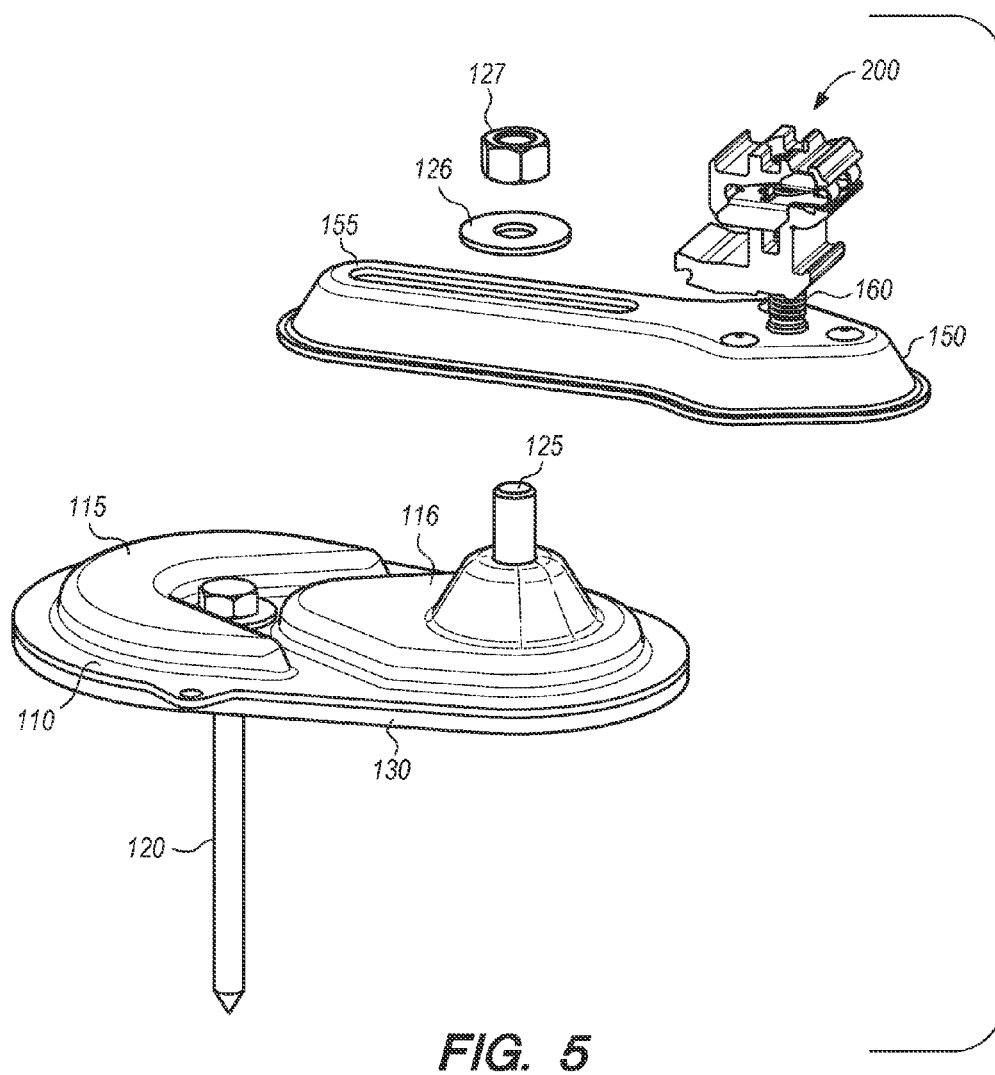
FIG. 5 is another partially exploded view of the two-piece photovoltaic module mounting system illustrated in FIG. 1.

Referring now to FIGS. 4A, 4B and 5, in various embodiments, drainage channels 111, 112 circumscribe raised portions 115, 116 respectively of base portion 110. In a typical installation, base portion 110 will be attached to a roof so that fatter portion of base portion 110 points up-roof in the direction labeled "D" in FIG. 4B. By having the fatter portion of base portion 110 point up-roof, rain water running down the roof will be diverted around raised portions 115, 116 further down the roof and will not aggregate around hole 118 or lag bolt head 122 after it is installed. Otherwise, the geometry would tend to direct water around bolt head 122, where it would sit and potentially leak into the roof, cause base portion 110 to rust, and/or both.

One of the primary benefits of the system according to the various embodiments of the present invention, is the ability to lay down base portion 110 as the installer steps through the array rather than laying the base portions of the entire array first and then installing the photovoltaic modules. This install-as-you-go technique is sometimes referred to as "run and gun." This benefit is explained in greater detail in the context of FIGS. 6-8.

Figure 6:
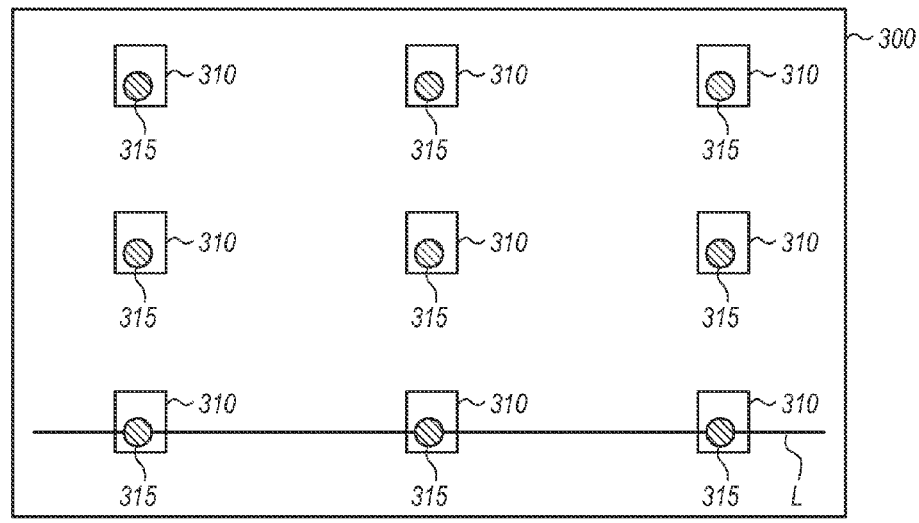
FIG. 6 is a conventional layout of a flashing-based rail-free photovoltaic mounting system installed on a roof surface.

FIG. 6, which is prior art, illustrates roof surface 300 with a plurality of flashings 310 and mounting supports 315 (sometimes called "pucks"). The layout in FIG. 5 represents the conventional way of installing rail-free photovoltaic modules on shingle rooftops. The first step in this process is to measure or snap a chalk line, such as line "L" in FIG. 5 that runs parallel to and near the roof eave. This line is used to install the first row of mounting hardware 310, 315. Usually, the remainder of the mounting hardware is then installed in vertical rows based on the locations of the hardware in the first row and the known dimensions of the photovoltaic modules to be used in the array. Once all the mounting hardware has been installed, photovoltaic modules 320 are attached one-by-one to mounting hardware 310, 315, and electrically interconnected to one another, to complete the array. In some cases an array skirt such as skirt 330 of FIG. 6 may be installed to the first row of the array as and aesthetic trim piece and also to provide a stop for persons and equipment sliding down the roof during installation. This may be done as soon as the first row is installed or at some later point during the installation of the array.

Figure 7:
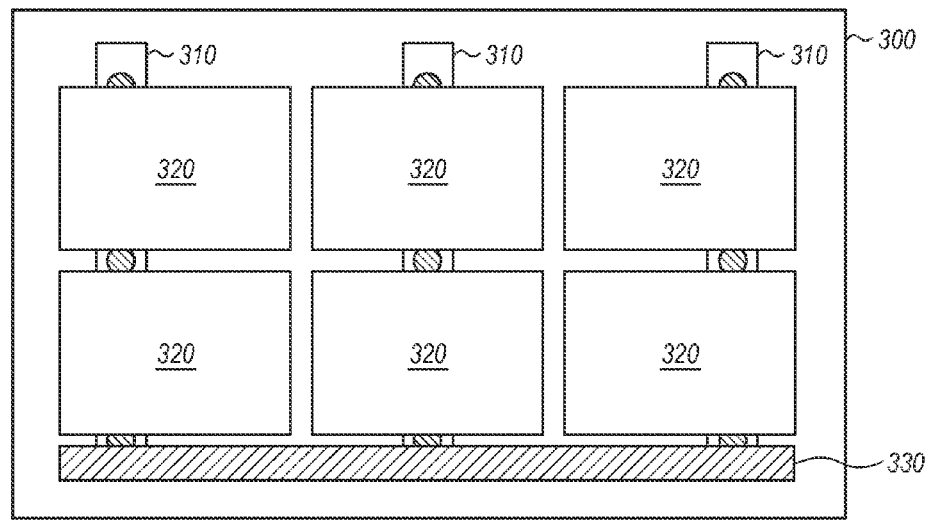
FIG. 7 is an array of photovoltaic modules installed using a conventional flashing-based rail-free photovoltaic mounting system.

FIG. 7 illustrates a completed array of solar modules 320 that has been installed using the conventional rail-free installation system of FIG. 5. It should be appreciated that other elements may also be used in the installation of a conventional array, as well as with arrays installed using mounting systems according to the various embodiments of the invention, such as interlock devices to interlock two or four adjacent solar panels at or near their corners so that forces on any one panel are distributed over the array, and also to reduce the number of roof penetrations attributable to vertical supports. Although such an array installs quickly after the layout of support flashings has been laid out and attached to the roof surface, in particular if rock-it style pivot locking coupling devices are used, no work further work on the installation can be performed until the supports have all been installed. This creates a choke point during installation.

Figure 8:
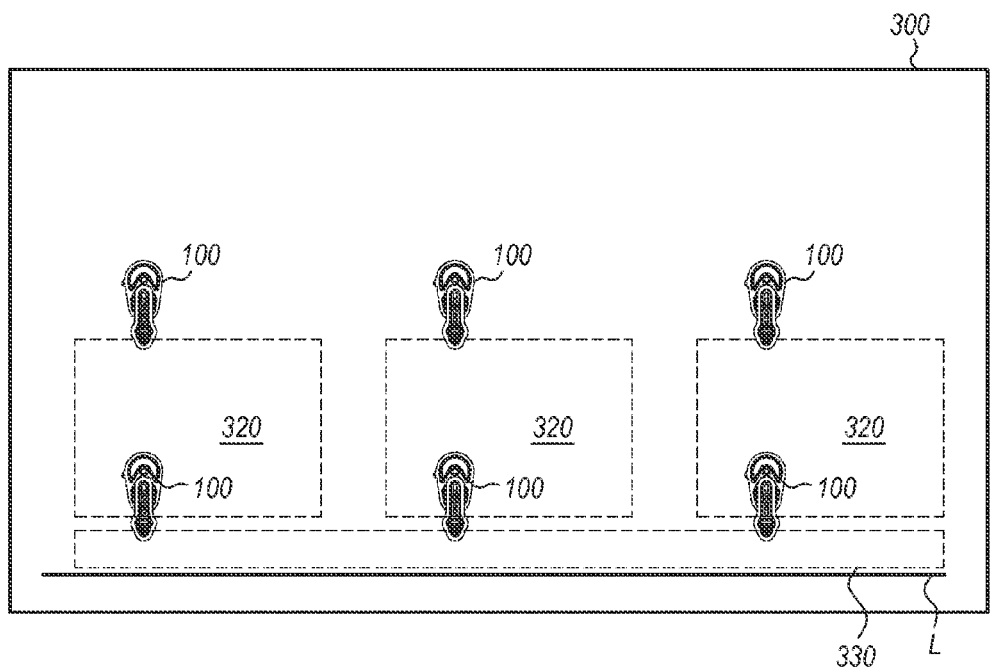
FIG. 8 is a partially installed array of photovoltaic modules installed using a two-piece mounting system according to various embodiments of the invention.

FIG. 8 illustrates a partially installed array of solar modules 320 using mounting systems according to various embodiments of the invention. As with prior art systems, the installation typically starts by snapping or drawing a straight line "L" parallel to and near the roof eave. This line will be used to install the first row of two-piece mounting systems 100 according to the various embodiments of the invention. For ease of illustration, modules 320 and array skirt 330 are shown in dotted outline so that the two-piece mounting systems 100 are clearly visible underneath. As seen in this Figure, only the first row of mounting systems 100 needs to be installed for the installation to proceed. Typically, base portion 110 would be installed first by drilling a pilot hole at the desired location, inserting a drill bit through integral pilot hole guide 119 in base portion 110, and then following that hole with a larger hole using a bit sized near the size of the lag bolt 120. Then, in various embodiments, base portion 110 will be moved so that hole 118 is co-located over the hole drilled in the roof so that the fatter end of the base portion 110 points up-roof and lag bolt 120 will be driven through hole 118 into the roof hole, preferably into a roof rafter for maximum resistance to pullout. As lag bolt 120 is driven into the roof it will pass through the layer of sealant formed on the underside of base portion 110, thereby sealing the hole as base portion 110 is pulled closer to the roof surface by head 122 of lag bolt 120. The sealant will be compressed in this process of bolting base 110 to the roof surface and some may be squeezed out around the perimeter of the base portion 110, further protecting the roof penetration caused by lag bolt 120 from the ingress of water.

Next, movable portion 150 will be attached to base portion 110 over threaded pivot 125 and will be locked down with locking nut 127 using a wrench or cordless driver. In some embodiments, however, movable portion 150 may be loosely attached to base portion 110 prior to installation, such as, at the time of manufacture. This process is then repeated until the first row of two-piece mounting systems has been installed. In various embodiments, an array skirt such as skirt 330 may be attached to coupling devices 200 of each two-piece mounting system 100. However, unlike known rail-free mounting systems, the remaining two-piece mounting systems 100 are installed one-by-one as the installer(s) moves through the array, rather than installing them all first.

After the first row of mounting hardware and any other desired accessories such as an array skirt are installed, an installer can pivot or otherwise attach the frame of module 320 to the opposite side of coupling device 200 from array skirt 330 and allow module 320 to drop down until it touches or is near the roof. It may be desirable to attach coupler 200 and movable portion 150 of the next system 100 to the frame of module 320 and allow that to rest on the roof, serving as both a kick-stand and a location guide, while the installer affixes base portion 110 to the roof at the correct location using the previously described process. After that step has been completed, movable portion 150 and module 320 can be lifted back up and movable portion 150 slid along the module frame so that slot 155 lines up with the stud 125 and then dropped back down to rest on base portion 110 so that washer 126 and locking nut 127 may be attached to lock system 100 and module 320 into place. In this way, the installer is free to attach base portions 110 as he moves through the installation process, without any additional measuring, significantly increasing the speed of the overall installation, and potentially reducing the number of persons required to perform the installation.

Figure 9:
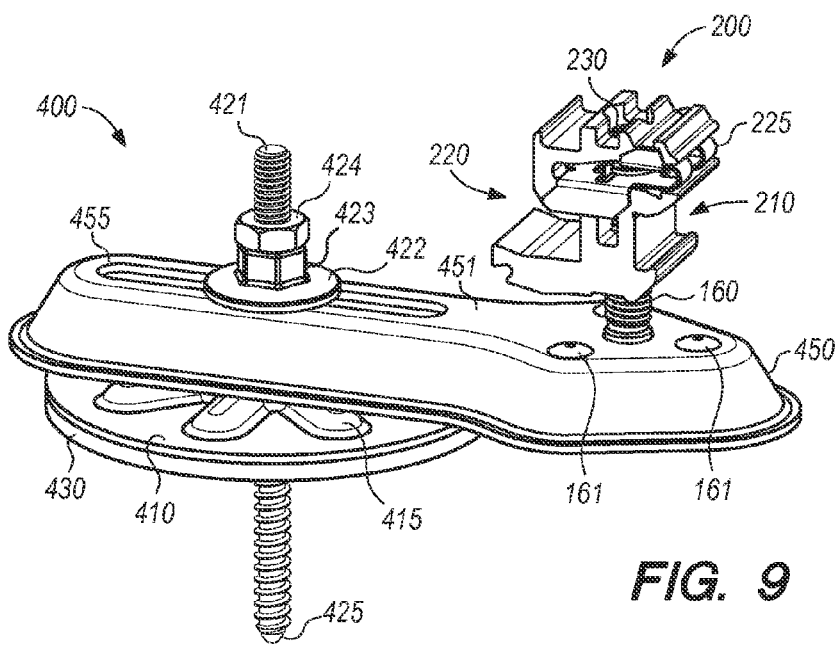
FIG. 9 is a perspective view of a photovoltaic mounting system according to another exemplary embodiment of the invention.
Figure 10:
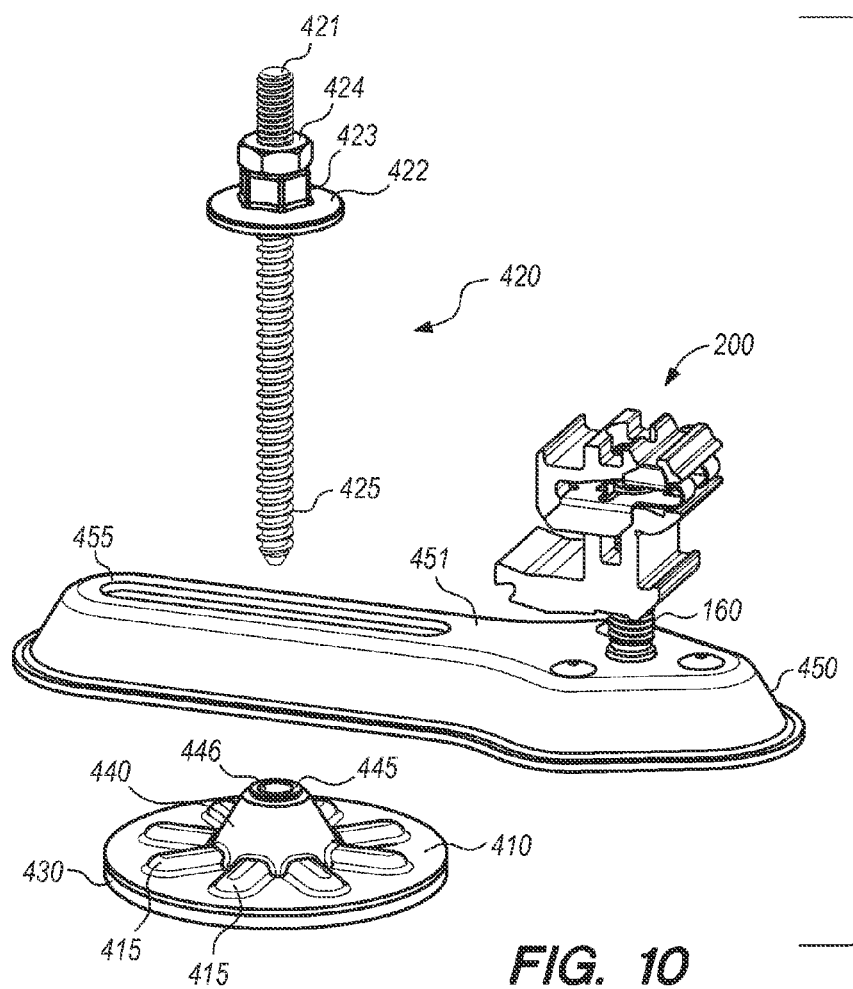
FIG. 10 is a partially exploded view of the exemplary photovoltaic mounting system illustrated in FIG. 9.
Figure 11A:
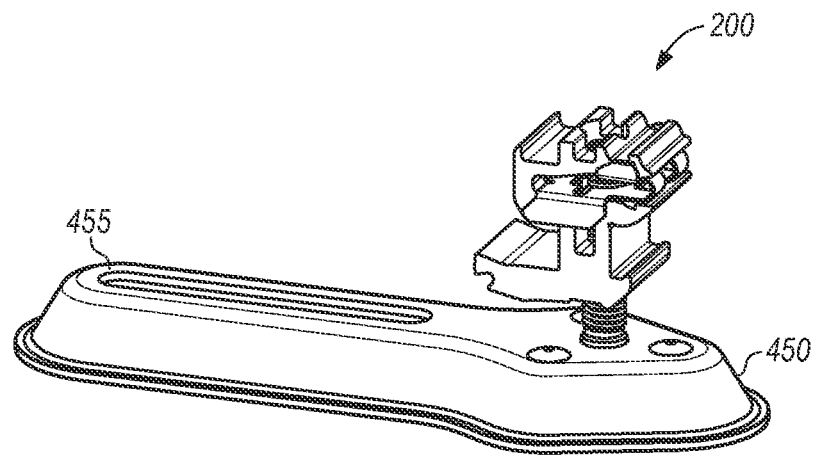
FIGS. 11A and 11B are side and bottom perspective views respectively of a movable portion of the photovoltaic mounting system illustrated in FIG. 9.
Figure 11B:
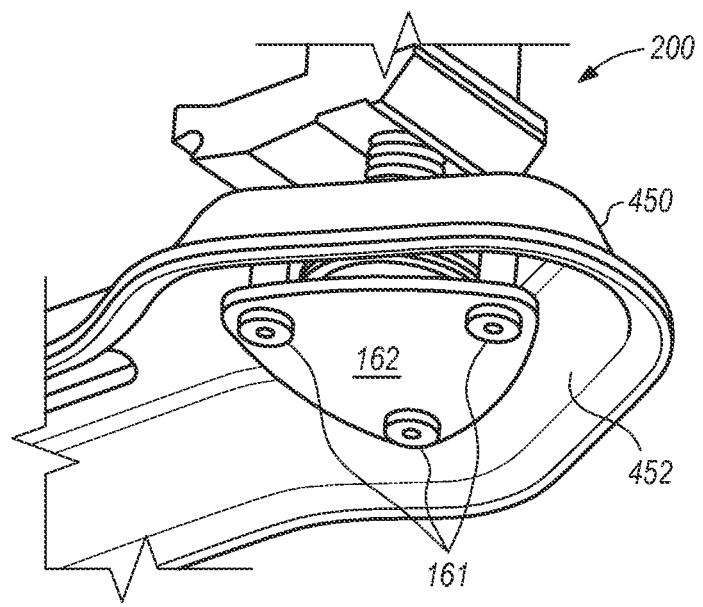

Referring now to FIGS. 9, 10, 11A, 11B, 12A, 112, 12C, and 13, these Figures illustrate various view of another two-piece photovoltaic mounting system 400 according to various embodiments of the invention. Movable portion 450 in these Figures is similar to movable portion 150 shown in FIGS. 1-8. Movable portion 450 includes channel 455 that allows movable portion 450 to pivot about a pivot point to adjust the position of a coupling device with respect to the frame of a photovoltaic module or other structure. Movable portion 450, as depicted in these Figures also includes coupling device 200 rotatably fastened to movable portion 450 by threaded stud 160 which, in a preferred embodiment and as explained in greater detail in the context of FIG. 11B, is able to rotate about movable portion 450 without disconnecting from it. In this manner, coupling device 200 may be rotated around threaded stud 160 to raise and lower coupling device 200, and any photovoltaic modules or other structures supported by it, with respect to movable portion 450. Alternatively, stud 160 may be rotated while holding coupling device 200 in place, accomplishing the same result. In the latter case, a rotation tool may be applied to the top of stud 160 via opening 230 in the top of coupling device 200 revealing a complimentary shaped head such as a slotted head, Phillips head, or Torx head.

In various embodiments, and as explained in the context of the exemplary system illustrated and described in the context of FIGS. 1-8, coupling device 200 may be a rock-it style coupling device as shown, having key side 210 and tongue side 220, or it may be another type of coupling device, such as, for example, a clamping-style coupling device that is compatible with standard photovoltaic modules or even with frameless modules.

Unlike exemplary system 100 depicted in FIGS. 1-8, system 400 of FIGS. 9, 10, 11A, 11B, 12A, 12B, 12C and 13 has a substantially flat and symmetrical base portion 410 that may be a generally round shaped disk with plurality of raised portions 415 that span out radially from center 440 to the outer edge of base portion 410. These raised portions 415 may provide a surface upon which to support and move movable portion 450 with respect to base portion 410 so as to support movable portion 450 without creating so much friction that movement of the movable portion 450 is impeded. They may also prevent water from getting between base portion 410 and movable portion 450.

Base portion 410 may further include generally conical center portion 440 that rises upwards toward movable portion 450. Conical center portion 440 may have a gasket such as gasket 445 with opening 446 that passes through gasket 445 and also through base portion 410 to permit passage of lower threaded portion 425 of hanger bolt 420 for attachment to a roof surface or roof rafter.

FIG. 10 illustrates how all the components of the exemplary system depicted in FIG. 9 may fit together. After a pilot hole has been drilled and followed by a hole large enough to accommodate hanger bolt 420, base portion 410 is positioned so that the hole in the roof surface is directly under hole 446 in base portion 410. Then, movable portion 450 is positioned over base portion 410 so that slot 455 is at least partially aligned over hole 446. Bottom threaded portion 423 of hanger bolt 420 is inserted down through slot 455 and into hole 446 and is driven into the roof surface and/or roof rafter using an electric or manual driver, most but not all the way down, so as to hold base portion 410 in place but still allow movable portion 450, and by extension coupler 200, to be positioned at a desired location. After coupler 200 has been positioned at the desired location, bolts 423 and 424 may be further tightened compressing the bottom side of movable portion 450 to raised portions 415 in the top surface of base portion 410. A washer, such as washer 422 may be utilized to further distribute the compression force of bolt 423 on the top surface of movable portion 450. This will also compress adhesive layer 430 against the roof. Adhesive layer 430 in combination with gasket 445 will preferably prevent water from penetrating the roof surface around threaded portion 423 of hanger bolt 420. As discussed above, adhesive layer 430 may include a release sheet that is pulled off at the time of installation to keep the adhesive layer intact prior to installation. Alternatively, adhesive layer 430 may be completely separate from base portion 410 and have a release sheet on both sides so that it can be first attached to the bottom side of base portion 410 and then to the roof surface around the hanger bolt hole. In still a further embodiment, adhesive layer 430 may be a layer of foam, rubber, or other compressible material that when compressed between base portion 410 and a roof surface, will create a watertight seal that will prevent water from entering the roof penetration around the lag bolt.

Referring now to FIGS. 11A and 11B, these figures illustrate one exemplary way of attaching coupling device 200 to base portion 150 so that threaded stud 160 is able to rotate with respect to movable portion 450 without disengaging from movable portion 450. In other words, in a preferred embodiment, rotation of threaded stud 160 will not cause stud 160 to move up or down with respect to movable portion 450. Referring specifically to FIG. 10B, in various embodiments, the underside of movable portion may include recess 452 that accommodates a plate and set of rivets that collar the bottom of threaded stud 160 so that it is able to rotate freely without disengaging from movable portion 450. It should be appreciated that a different attachment mechanism than that shown in FIG. 11B may be used with the various embodiments of the invention.

Figure 12A:
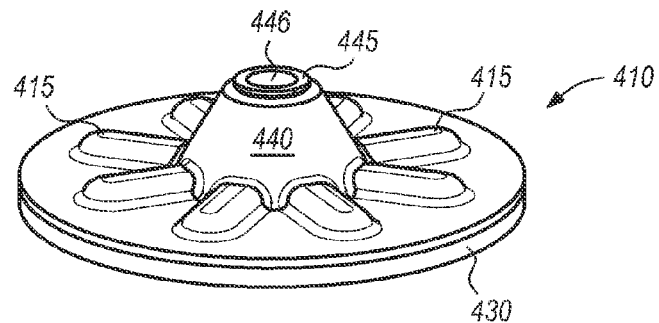
FIGS. 12A, 12B, and 12C are sequentially granular views of a base portion of the photovoltaic mounting system illustrated in FIG. 9.
Figure 12B:
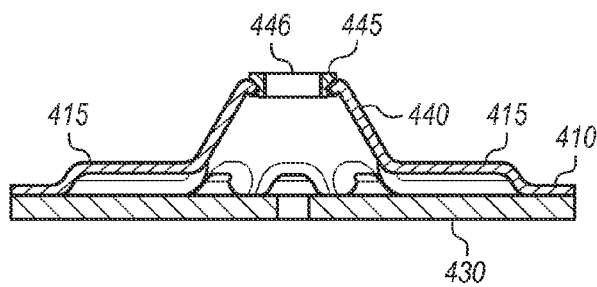
Figure 12C:
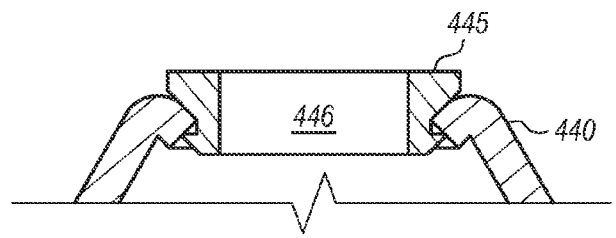

Referring now to FIGS. 12A-12C, these Figures illustrate in greater detail, the components and features of base portion 410 according to various exemplary embodiments of the invention. As seen in 12A, base portion 410 may be a symmetrical disk-like shape with raised portions 415 that fan out radially from center portion 440. As discussed herein, when movable portion 450 sits on top of base portion 410, these raised portions will engage the bottom edge of movable portion 450 and allow it move across the top of base portion 410. These raised portions 415 or ridges, also provide additional strength to base portion 410 to give it extra strength to handle the forces that base portion 410 will be subject to when it is torqued down to the roof surface and/or roof rafter, mated with the movable portion 450, and when coupling device 200 of movable portion 450 is supporting a portion of a photovoltaic array.

FIG. 12B illustrates a side cross-sectional view of base portion 410 according to various exemplary embodiments. Raised portions 415 fan out around hollow center portion 440 and the entire assembly sits on sealant layer 430. Rubber gasket or grommet 445 sits at the top of raised portion 440, held in place by a flange that circumscribes the top of raised portion 440. Opening 446 formed in the center of gasket 445 is aligned to be over the opening formed in the bottom of base portion 410 and sealant layer 430.

Figure 13:
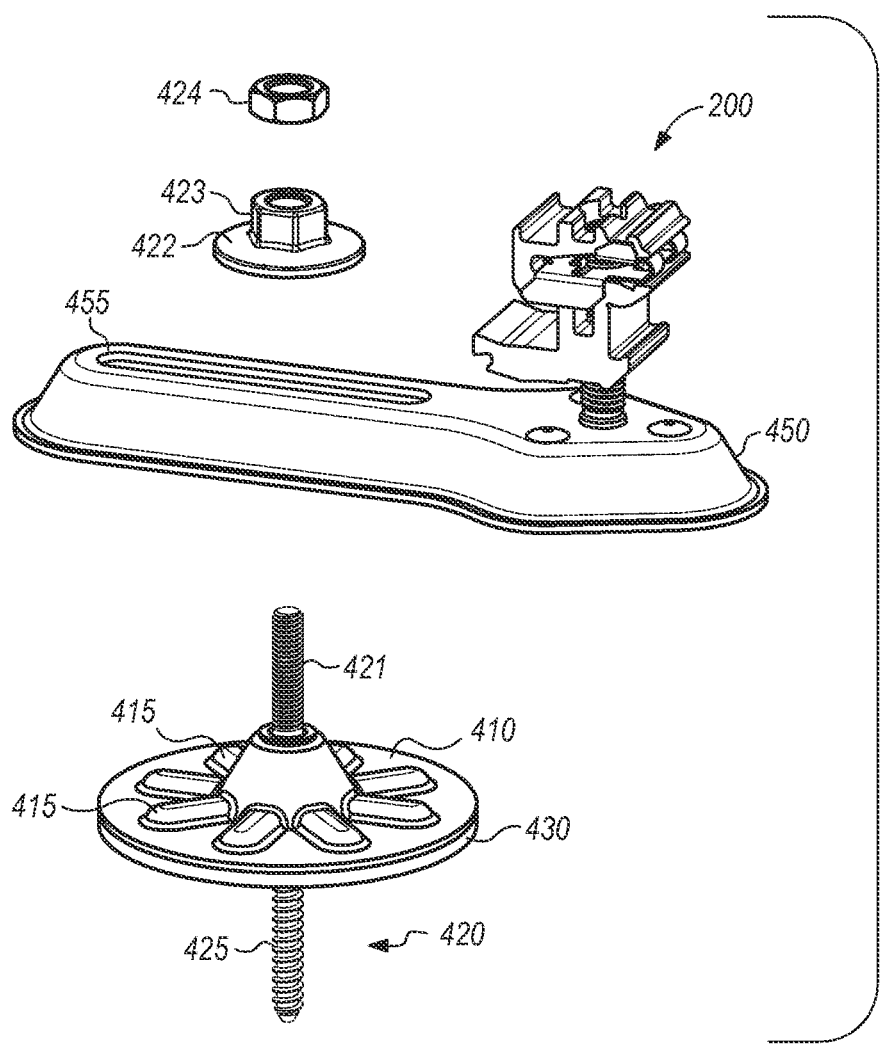
FIG. 13 is another partially exploded view of a photovoltaic mounting system shown in FIG. 9.

FIG. 13 is a partially exploded view of the two-piece mounting system shown in FIG. 10, illustrating in particular how the system can be deconstructed, for example, in the event of a repair. Unlike in the embodiment of FIG. 10, in this example, hanger bolt 420 is installed into the roof deck first, and base portion 410 is placed over it, such as by pushing top threaded end 421 through opening 446 so that gasket 445 fits snugly around it. In this embodiment, movable portion 450 may be removed or repositioned by removing locking nut 424 and nut 423. The photovoltaic panel or other structure attached to the coupling device 200 can then be lifted upward, away from the roof, releasing upper threaded portion 421 from slot 455 so that it can be rotated away and then disconnected from the photovoltaic panel or other structure. In various situations, it may be desirable to let base portion 410 remain in the roof so as not to break the water tight seal around the lower threaded portion 420 of the lag bolt. Further, if movable portion 450 is not going to be re-installed, a cover, shield or other device may be attached to upper threaded portion 421 so as to render this protrusion safer for future workers on the roof.

Figure 14:
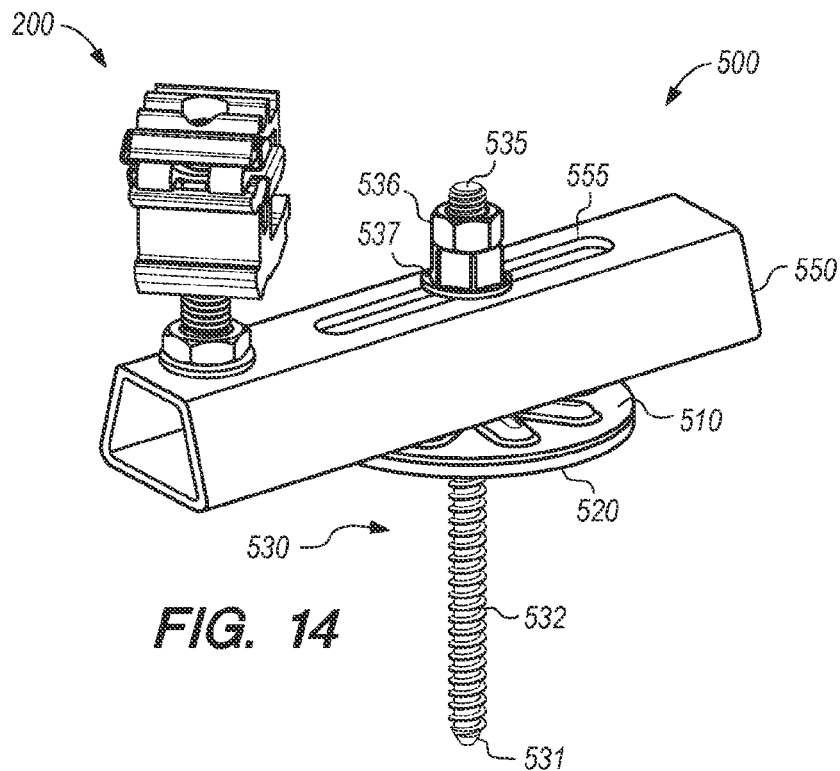
FIG. 14 is a perspective view of a photovoltaic mounting system according to yet another exemplary embodiment of the invention.
Figure 15:
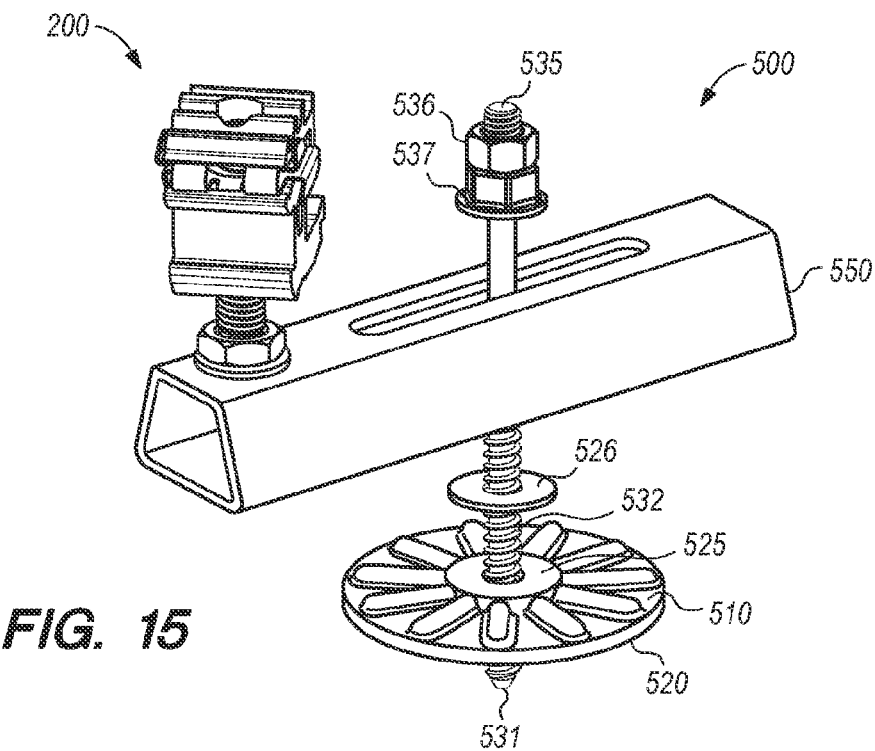
FIG. 15 is a partially exploded perspective view of the photovoltaic mounting shown in FIG. 14.

Referring now to FIGS. 14 and 15, these Figures illustrate various view of another photovoltaic mounting system according to various embodiments of the invention. This system 500 incorporates some of the features of systems shown in the preceding figures. The system 500 includes a substantially planer base portion 510 with a plurality of ridges formed on a top-facing side and a rubber layer 520 or other compressible material. Hanger bolt 530 with a lower threaded portion 532 has tip 531 that is attached to a roof surface and preferable into a roof rafter. Base portion 510 may also include rubber washer 525 and substantially similarly sized metal washer 526 above rubber washer 525 in the hanger bolt stack starting at base portion 510 and moving upwards to movable portion 550. Movable portion 550 may be a unibody structure with pair of aligned slots 555 that allow movable portion 550 to be positioned with respect to base portion 510 while pivoting about upper threaded portion 535 of lag bolt 530 joining these two components. At least one nut 536 and washer 537 may be utilized to compress movable portion 550 against base portion 510.

It should be appreciated that, although in the exemplary embodiment depicted in FIGS. 14 and 15, movable portion 550 is a four-sided tapered rolled form metal structure, a different cross-sectional geometry may be utilized such as rectangular or square. As with the other embodiments, once movable portion 550 has been positioned with respect to base 510, nut 536 may be used to secure movable portion 550 in place via hanger bolt 530. Movable portion 550 may also include coupling device 200 near the opposite end of movable portion 550 from slot 555. Coupling device 200 as depicted in these Figures is a rock-it style coupling device, however, it should be appreciated that a clamping-style coupling device may be substituted for rock-it style coupling device 200 without departing from the spirit or scope of the invention.

Figure 16:
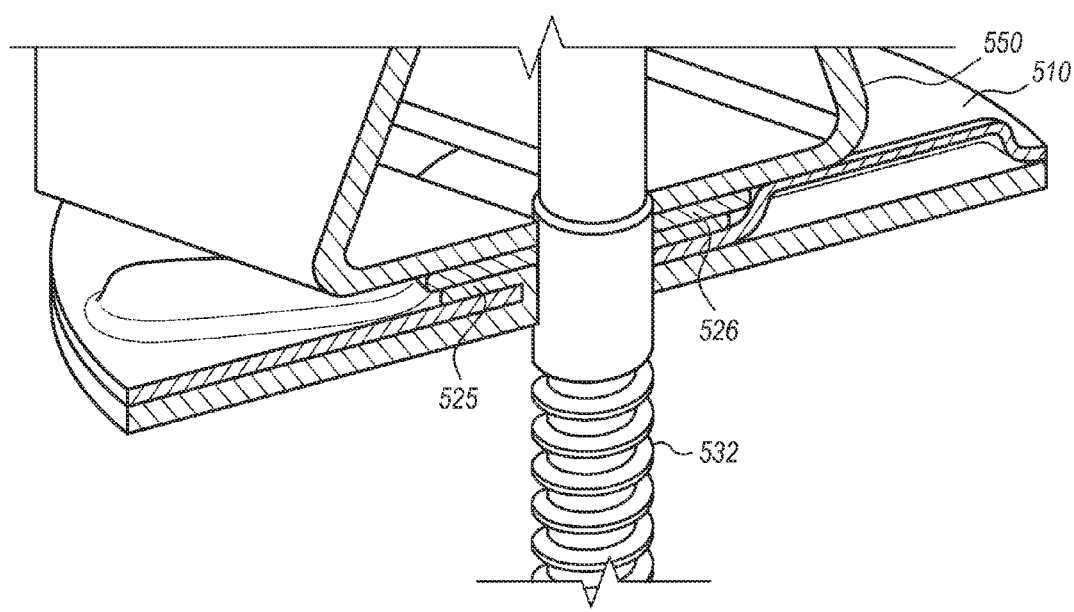
FIG. 16 is a partial close-up cut-away view of the photovoltaic mounting system shown in FIG. 14 after the system has been installed on a support surface or roof.
Figure 17A:
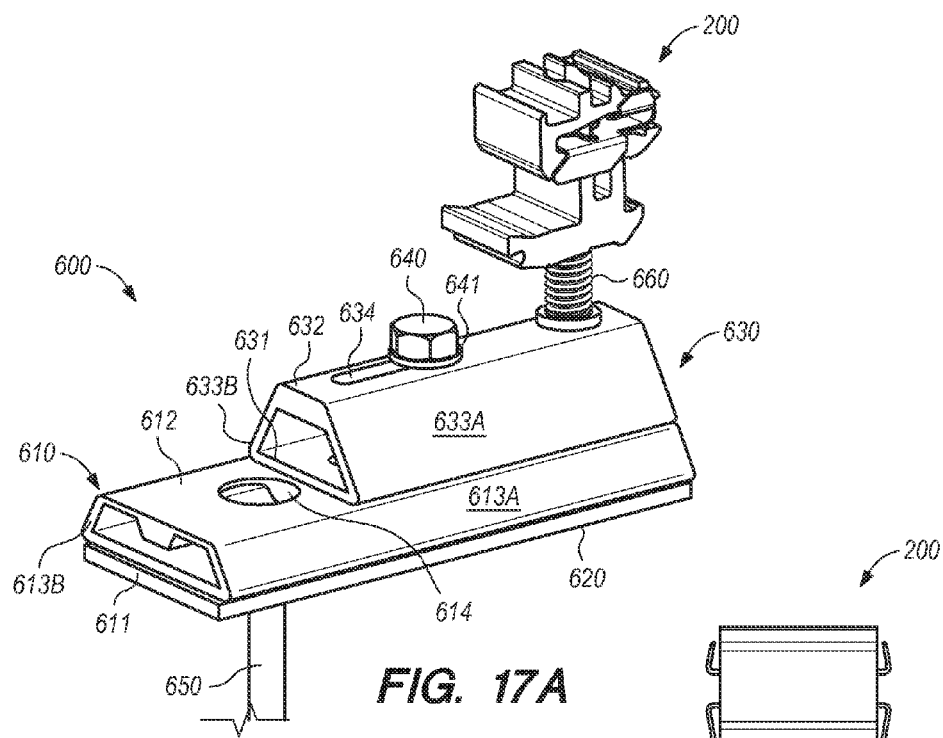
FIGS. 17A and 17B are perspective and end views respectively of a photovoltaic mounting system according to a further embodiment of the invention.
Figure 17B:
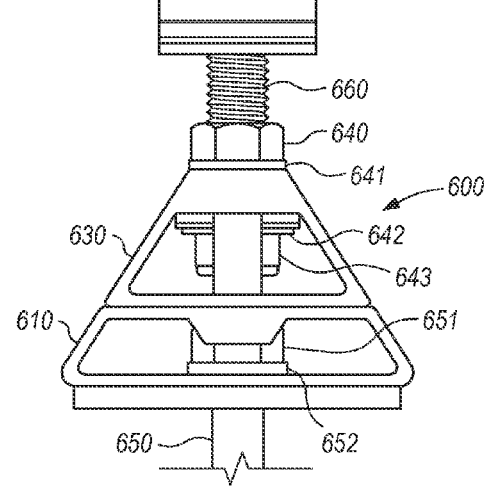

Referring now specifically to FIG. 16, this figure shows a close-up partial cut-away view of system 500, giving particular detail to the fitment of the system components when movable portion 550 is compressed to base portion 510 after lower threaded portion 532 of hanger bolt 530 has been driven into a support surface such as a roof or roof rafter, and nut 536 has been torqued down against the top surface of movable portion 550. In various embodiments, metal washer 526 will compress rubber washer 525 creating a seal that prevents the ingress of water from the sides as well as from above. In various embodiments, rubber base 520 will prevent water from penetrating under base portion 510 and leaking into the roof penetration caused by lower threaded portion 532 of hanger bolt 530. Alternatively, as discussed above, rubber base 520 may be replaced with a layer of pre-formed sealant material such as butyl that contains a release sheet on the roof-facing side that is removed just prior to installation. In still further alternatives, rubber base may be omitted and an installer will instead apply a layer of sealant to the underside of base portion 510 using a caulk gun, tube or other dispenser.

FIGS. 17A, 17B, 18, 19 and 20 show a photovoltaic mounting system according to a further embodiment of the invention. System 600 in the embodiment shown in these figures is generally pyramid-shaped and formed out of a pair of tapered extrusions. It consists of base 610 having bottom portion 611, top portion 612 and tapered sidewalls 613A, 613B. Layer of rubber, sealant or other compressible, water resistant material 620 may be formed on bottom portion 611 of base 610. In various embodiments, this may be a peel and stick sealant pad. Base portion 610 may also have pair of concentric openings 614, 615 for receiving a screw, lag bolt or other mechanical fastener, such as lag bolt 650, and in the case of opening 614, to accommodate a torque tool for torqueing such a fastener to securely attach base portion 610 to a support surface such as a roof.

Figure 18:
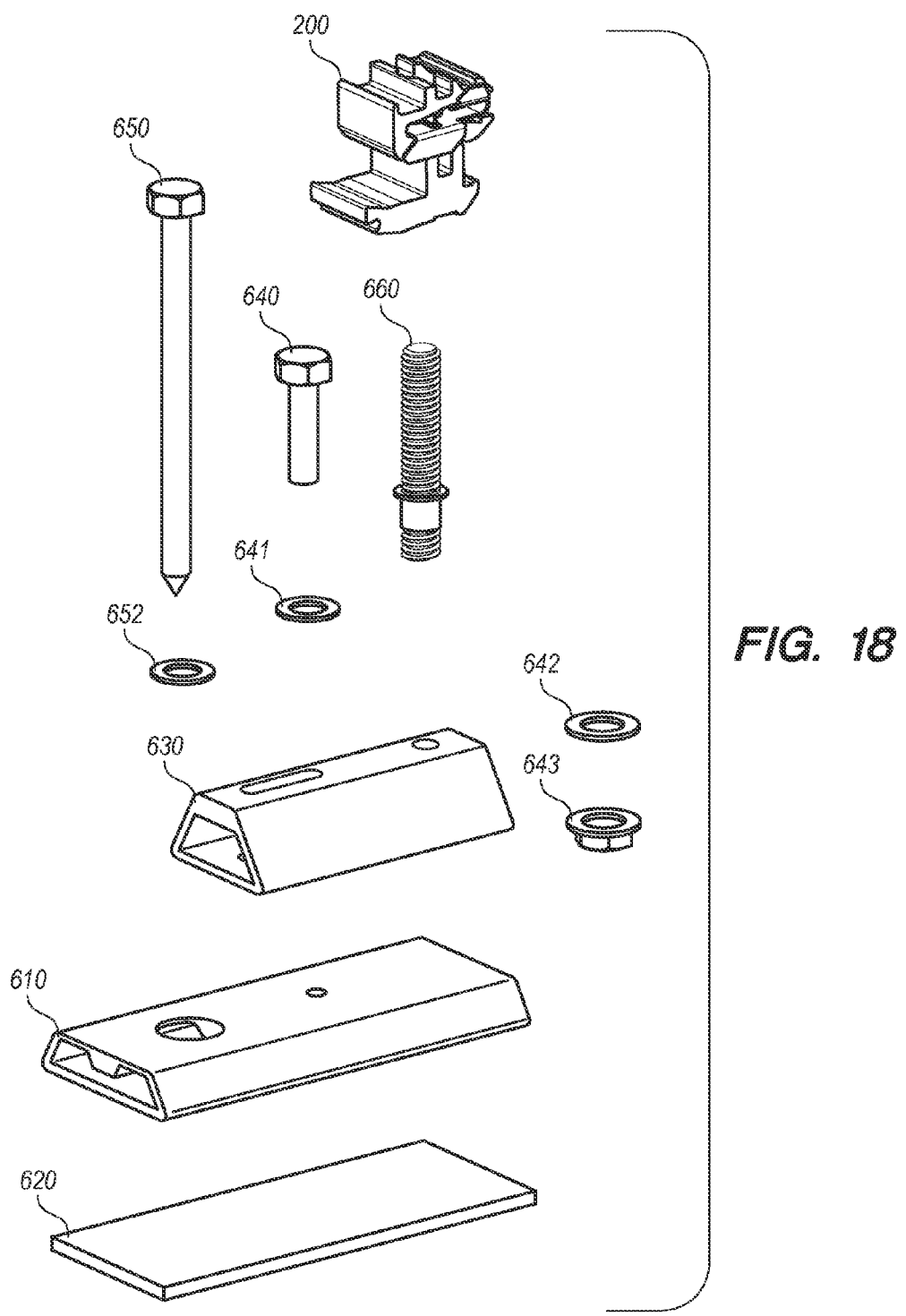
FIG. 18 is an exploded perspective view of the photovoltaic mounting system shown in FIGS. 17A and 17B.
Figure 19:
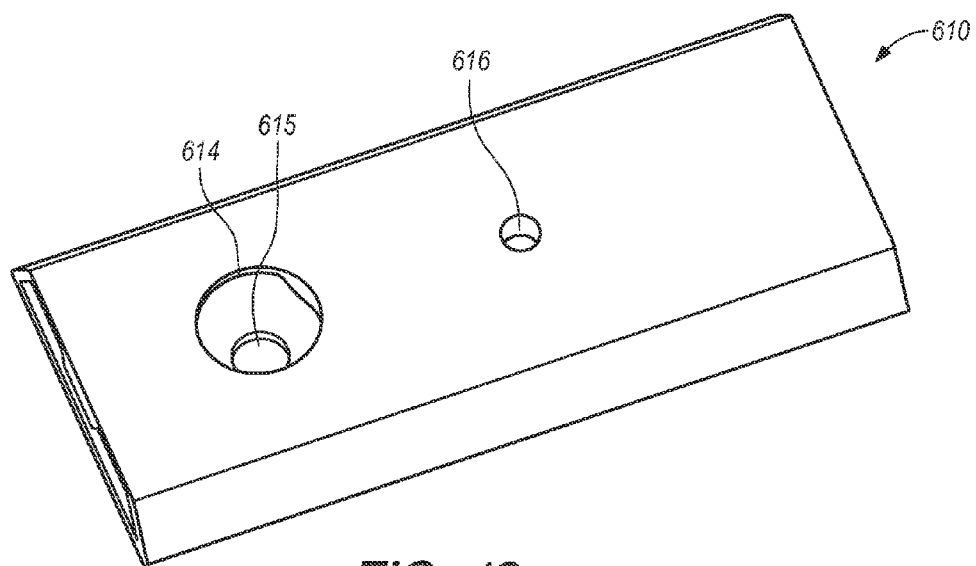
FIG. 19 is a top perspective view of the base portion of the photovoltaic mounting system shown in FIGS. 17A and 17B.

As seen in the exploded view of FIG. 18, system 600 also includes movable upper portion 630, having bottom 631, top, 632 and tapered sidewalls 633A, 633B, which, in various embodiments, may be tapered at the same angle as sidewalls 613A, 613B of base portion 610. Moreover, the width of top portion 612 and bottom portion 631 may be substantially the same so that side portions 613A, 631A, and 613B, 631B are aligned in common planes respectively. Movable upper portion 630 includes pair of slotted openings 634, 635 for receiving adjustment bolt 640. Adjustment bolt 640 permits movable portion 630 to be moved with respect to base portion 610 both laterally and rotationally with respect to base portion 610.

Movable upper portion 630 also supports a photovoltaic module coupling device such as device 200 for connecting to the frames of two or more photovoltaic modules. Coupling device is supported by upper portion 630 via threaded stud 660, which is in various embodiments may be permanently attached to upper portion 630. In a preferred embodiment, threaded stud 660 may be free to rotate about movable upper portion 660 without becoming detached from upper portion 630 so that, as with other embodiments of the invention, the height of coupling 200 relative to movable upper portion 630, and by extension, with respect to the roof surface, may be adjusted even after photovoltaic modules, fire skirt, or other structures have been connected to coupling 200. In various embodiments, this type of post-installation adjustment is facilitated by inserting a tool into the top of threaded stud 660 via opening 230 in the top of coupling 200.

FIGS. 21, 22, 23A, 23B, and 24 are directed to a photovoltaic mounting system according to yet a further embodiment of the invention. This embodiment may provide a less expensive alternative to previous embodiments, relying on rolled form steel rather than aluminum extrusions. As with systems corresponding to the other embodiments of the invention, system 700 is also a two-piece mounting system comprising base portion 710 and movable top portion 730. In this example, base portion 710 is a tube of material having a rectangular cross section composed of bottom 711, top 712, and sides 713A and 713B. As with base portion 610 in system 600, base portion 710 includes layer of sealant material 720 attached to its bottom 711 and has concentric holes 714, 715 formed on top 712 and bottom 711 portions respectively, for receiving a lag bolt or other mechanical fastener.

Movable upper portion 730 is a disk of material having slot 734 and through-hole 738, both of which cut through the entire thickness of upper portion 730 from top surface 732 to bottom surface 731. Movable upper portion 730 is supported by top surface 712 of base portion 710 and held in place by bolt 735, which passes through slot 734 and is locked in pace with corresponding nut 736 and washer 737. Loosening of nut 736 allows upper portion 730 to be moved with respect to base portion 710.

Figure 20:
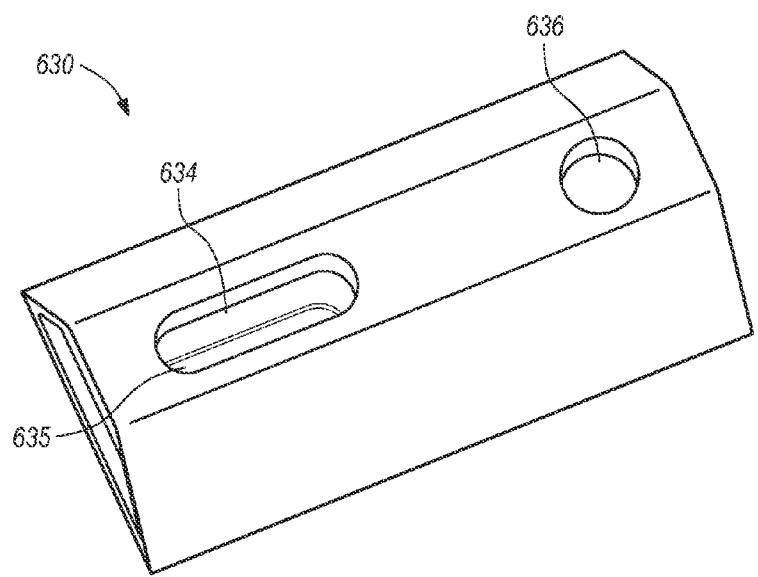
FIG. 20 is a top perspective view of the movable portion of the photovoltaic mounting system shown in FIGS. 17A and 17B.
Figure 21:
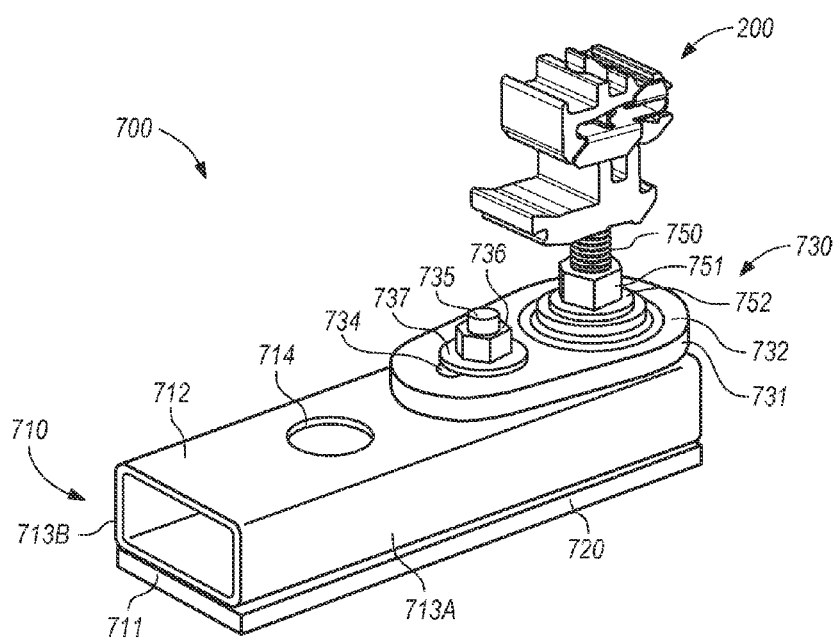
FIG. 21 is a perspective view of a photovoltaic mounting system according to an additional embodiment of the invention.
Figure 22:
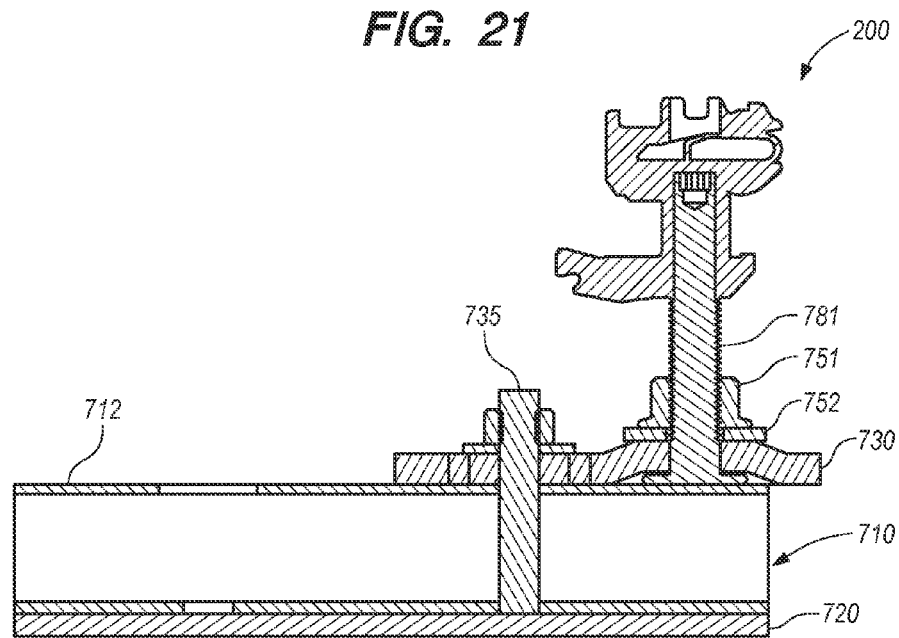
FIG. 22 is a side cut-away view of the photovoltaic mounting system shown in FIG. 21.
Figure 23A:
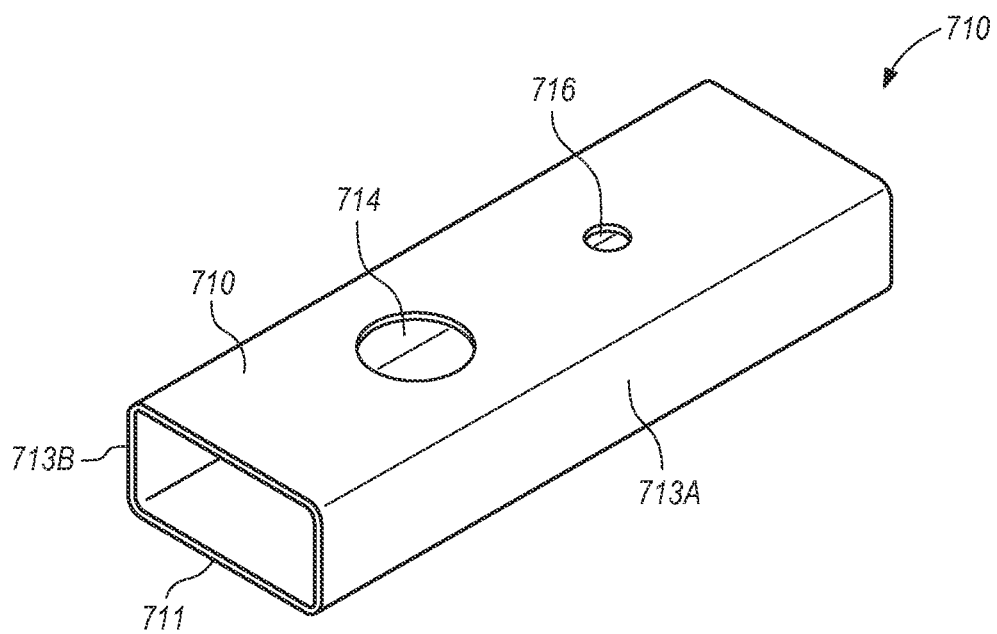
FIGS. 23A and 23B are perspective isolation view of the base portion and movable portions respectively of the photovoltaic mounting system shown in FIG. 19.
Figure 23B:
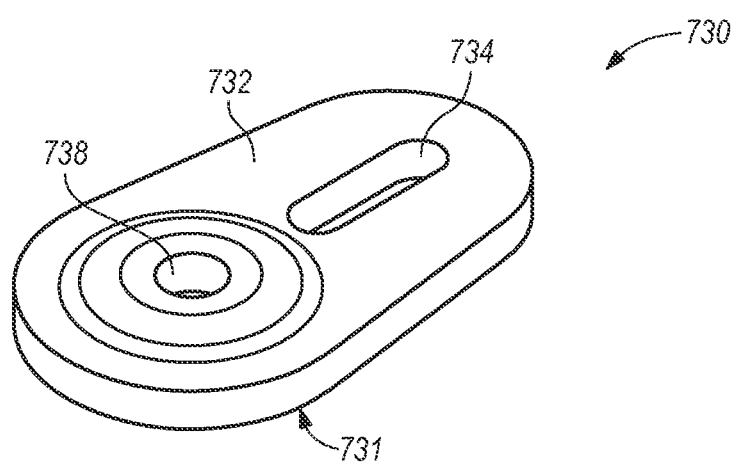
Figure 24:
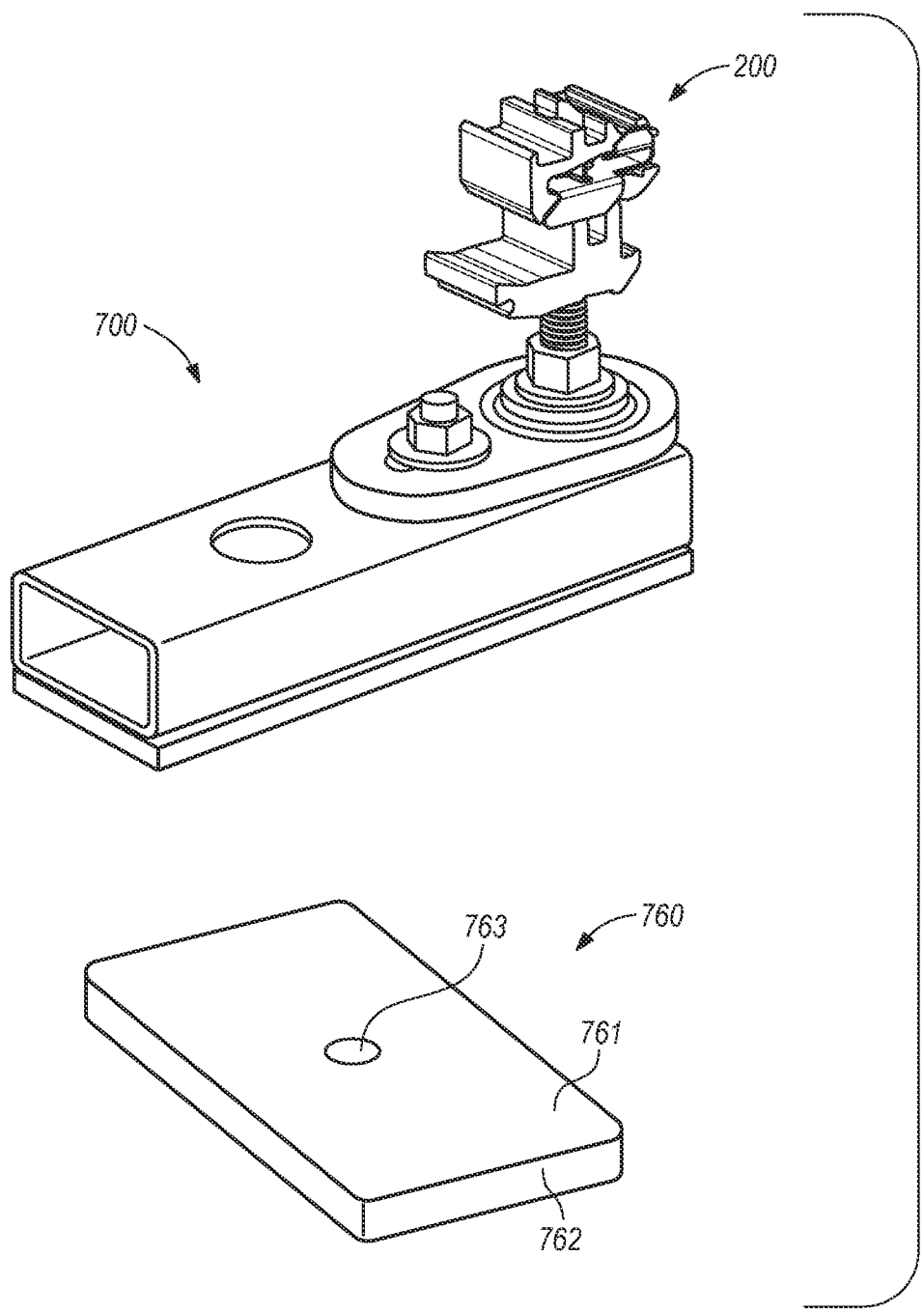
FIG. 24 is a perspective view of embodiment variation of the photovoltaic mounting system of FIG. 21.

Photovoltaic module coupling device 200 is also connected to upper portion 730 via threaded stud 750. In a preferred embodiment, as illustrated in FIG. 20, upper portion 730 has a raised portion around opening 738 to permit a base of threaded stud 750 to rest on top surface 711 while remaining captured between base portion 710 and upper portion 730. This will permit rotation of threaded stud 750 to raise and lower coupling 200 without stud 750 coming disconnected from the assembly due to over rotation.

As with the other embodiments of the invention, although coupling 200 is illustrated as a rock-it coupling device, it should be appreciated that a clamping-style coupling could be substituted for the rock-it without departing from the spirit or scope of the invention. Such modification would be foreseeable to a person of ordinary skill in the art.

As discussed herein, a common problem in the photovoltaic installation industry is finding a roof rafter when drilling pilot holes so that the mounting system can be sufficiently well anchored to stay on a roof for 20 to 30 years. It is common for installers to miss the rafter on the first or the second attempt each time a base mounting is attached to the roof. The relatively small size of the base portion in the various embodiments may be insufficient to cover up miss-drilled pilot holes, depending on how far away they are from the desired position of the base portion. In order to address this concern, various embodiments of the invention include a flashing plate, such as plate 760 illustrated in FIG. 22. This plate may be constructed similarly to base portion 710, having a layer of sealant material or rubber pad on the bottom side, as well as lag bolt through-hole 763 opening in the top surface 761 of flashing plate 760. In various embodiments, through-hole 763 may be centered in flashing plate 760. Alternatively, through-hole 763 may be located closer to either end of plate 760 so as to maximize the coverage distance from base portion 710 when a lag bolt is installed through base portion 710 and flashing plate 760 via openings 714, 715, and 763. Also, more than one through-hole may be included in flashing plate 760. In still further embodiments, flashing plate 760 may include one or more punch-outs or other features indicating a potential lag bolt position.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings.

The present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the disclosure should be construed in view of the full breath and spirit of the embodiments of the present invention as disclosed herein.

The invention claimed is:

1. A mounting system for photovoltaic panels comprising:
 a circular base portion comprising a plurality of raised portions extending radially in a plurality of directions from a center of the circular base toward a perimeter of the circular base on an array-facing side and a layer of sealant material on an opposite roof-facing side, wherein the array-facing side further comprises a conical center portion extending away from the plurality of raised portions and terminating in a gasket with at least one through-hole configured to receive a hanger bolt to secure the base portion to a roof surface and to serve as a pivot point;
 a movable portion, coupled to the base portion by the pivot point, and having a channel formed therein, wherein the pivot point passes through the channel and is configured to allow the movable portion to move about the pivot point laterally and rotationally while the conical center portion is positioned within the movable portion and the movable portion contacts and is supported by the plurality of raised portions;
 a fastener, attached to the pivot point, that secures the movable portion in a particular position with respect to the base portion via the channel; and
 a photovoltaic module coupler attached to the movable portion, wherein a distance between the movable portion and the coupler is adjustable.

2. The mounting system according to claim 1, wherein the fastener comprises at least one nut that attaches to the hanger bolt compressing the movable portion to the base portion.

3. The mounting system according to claim 2, wherein the photovoltaic module coupler is attached to the movable portion by a threaded post fixed to the movable portion so that it can rotate with respect to the movable portion while remaining connected to the movable portion and further comprising a female opening at one end for receiving a rotation tool.

4. The mounting system according to claim 3, wherein a distance between the movable portion and the coupler is adjustable by rotating the threaded post with a rotation tool via the female opening so that the coupler moves towards or away from the movable portion depending on the direction of rotation.

5. The mounting system according to claim 1, wherein the layer of sealant material is configured to prevent ingress of water into a roof via the lag bolt.

6. The mounting system according to claim 5, further comprising a removable release sheet formed under the layer of sealant material.

7. The mounting system of claim 5, wherein the layer of sealant material is configured to directly contact a roof surface, and the through hole is configured to allow the hanger bolt to penetrate the roof surface to secured the base portion and movable portion to the roof and provide a stationary pivot point for the movable portion.

8. The mounting system according to claim 1, wherein the raised portions are configured to and prevent water from getting between the base portion and movable portion.

* * * * *